(12) United States Patent
Foot et al.

(10) Patent No.: US 10,460,546 B2
(45) Date of Patent: Oct. 29, 2019

(54) RELAY BOX

(71) Applicant: Omnicell, Inc., Mountain View, CA (US)

(72) Inventors: John Foot, San Jose, CA (US); Paul Newby, Palo Alto, CA (US); Jeff Chang, Palo Alto, CA (US)

(73) Assignee: Omnicell, Inc., Mountain View, CA (US)

( * ) Notice: Subject to any disclaimer, the term of this patent is extended or adjusted under 35 U.S.C. 154(b) by 0 days.

(21) Appl. No.: 16/216,813

(22) Filed: Dec. 11, 2018

(65) Prior Publication Data

US 2019/0122473 A1    Apr. 25, 2019

Related U.S. Application Data

(63) Continuation of application No. 15/019,802, filed on Feb. 9, 2016, now Pat. No. 10,186,100.

(51) Int. Cl.
*G08B 21/00* (2006.01)
*G06F 7/00* (2006.01)
(Continued)

(52) U.S. Cl.
CPC ......... *G07C 9/00896* (2013.01); *G06F 21/86* (2013.01); *G06F 21/88* (2013.01);
(Continued)

(58) Field of Classification Search
CPC .......... A47G 29/141; A47G 2029/1257; A47G 29/124; A47G 29/20; G07C 2009/00769;
(Continued)

(56) References Cited

U.S. PATENT DOCUMENTS 5,190,185 A     3/1993  Blechl
5,377,864 A     1/1995  Blechl et al.
(Continued)

FOREIGN PATENT DOCUMENTS

DE    102004037365      12/2011
JP    2003027797 A      1/2003
(Continued)

OTHER PUBLICATIONS

JP Application No. 2018-539998 received an Office Action dated Jun. 4, 2019, 5 pages.

(Continued)

*Primary Examiner* — Dionne Pendleton
(74) *Attorney, Agent, or Firm* — Kilpatrick Townsend & Stockton LLP

(57) ABSTRACT

A relay box for securely transporting medications or other items. The relay box includes a main enclosure defining a hollow interior space, and a lockable lid. The lockable lid has a closed position that encloses the hollow interior space and an open position that provides access to the hollow interior space. The relay box further includes a display area and a memory storing a globally unique electronically readable identifier. The relay box may optionally include a battery and wireless communication circuitry. In other implementations, the relay box does not include a battery.

17 Claims, 9 Drawing Sheets

(51) Int. Cl.
  *G07C 9/00* (2006.01)
  *H04W 4/04* (2009.01)
  *G06F 21/86* (2013.01)
  *H04W 4/029* (2018.01)
  *H04W 4/35* (2018.01)
  *G06F 21/88* (2013.01)
  *H04W 4/80* (2018.01)
  *H04W 4/30* (2018.01)

(52) U.S. Cl.
  CPC ..... *G07C 9/00126* (2013.01); *G07C 9/00166* (2013.01); *G07C 9/00571* (2013.01); *H04W 4/029* (2018.02); *H04W 4/04* (2013.01); *H04W 4/30* (2018.02); *H04W 4/35* (2018.02); *H04W 4/80* (2018.02); *G07C 2009/0092* (2013.01)

(58) Field of Classification Search
  CPC ............ G07C 9/00174; G07C 9/00309; G07C 2009/00642; G07C 2009/00849; G07C 2009/00984; G07C 2011/04; G07C 2209/08; G07C 9/00007; G07C 9/00103; G07C 9/00111; G07C 9/00119; G07C 9/00126; G07C 9/00166; G07C 9/00563; G07C 9/00571; G07F 17/0042; G07F 11/54; G07F 11/58; G07F 17/00; G07F 17/005; G07F 7/06; A45C 13/18; A47B 88/463; B01D 17/12; B01D 21/30; B01D 35/00; B01D 35/14; B60R 25/20; B60R 25/257; B60R 25/33; B64C 2201/128; B64C 39/024; B64D 9/00; C02F 2203/006; C02F 2209/005; C02F 2209/40; C02F 3/00; C02F 3/006; C02F 3/04; C02F 3/06; C02F 3/082; C02F 3/1268; C02F 3/1273; C02F 3/14; C02F 3/302; E05B 17/0079; E05B 2047/0058; E05B 2047/0069; E05B 2047/0096; E05B 2047/0097; E05B 43/005; E05B 47/00; E05B 47/0003; E05B 47/06; E05B 65/46; E05B 65/52; E05B 71/00; E05B 85/01; E05G 1/005; E05G 1/04; G02F 1/167; G06F 16/2358; G06K 9/00771; G06Q 10/063; G06Q 20/145; G06Q 20/405; G06Q 30/00; G06Q 30/0201; G06Q 30/0261; G06Q 30/0645; G06Q 40/00; G06Q 50/26; G06Q 50/30; G08G 1/005; G08G 1/205; H04B 1/3877; H04B 1/3888; H04L 2463/103; H04L 63/083; H04M 1/0254; H04M 1/0266; H04M 1/0283; H04M 1/72527; H04M 1/72563; H04W 12/08; H04W 4/021; H04W 4/023; H04W 4/029; H04W 4/046; H04W 4/24; H04W 4/40; H04W 4/80; Y02W 10/15; Y04S 10/54; Y10T 70/7006
  See application file for complete search history.

(56) References Cited

U.S. PATENT DOCUMENTS

| | | |
|---|---|---|
| 5,615,625 A | 4/1997 | Cassidy et al. |
| 5,745,366 A | 4/1998 | Higham et al. |
| 5,805,455 A | 9/1998 | Lipps |
| 5,805,456 A | 9/1998 | Higham et al. |
| 5,905,653 A | 5/1999 | Higham et al. |
| 5,927,540 A | 7/1999 | Godlewski |
| 6,011,999 A | 1/2000 | Holmes |
| 6,039,467 A | 3/2000 | Holmes |
| 6,040,771 A * | 3/2000 | Kim ................ E05G 1/10 340/545.1 |
| 6,151,536 A | 11/2000 | Arnold et al. |
| 6,170,929 B1 | 1/2001 | Wilson et al. |
| 6,272,394 B1 | 8/2001 | Lipps |
| 6,385,505 B1 | 5/2002 | Lipps |
| 6,472,973 B1 | 10/2002 | Harold et al. |
| 6,609,047 B1 | 8/2003 | Lipps |
| 6,640,159 B2 | 10/2003 | Holmes et al. |
| 6,760,643 B2 | 7/2004 | Lipps |
| 6,975,922 B2 | 12/2005 | Duncan et al. |
| 7,006,893 B2 | 2/2006 | Hart et al. |
| 7,348,884 B2 | 3/2008 | Higham |
| 7,571,024 B2 | 8/2009 | Duncan et al. |
| 7,654,261 B1 | 2/2010 | Rockhold |
| 7,675,421 B2 | 3/2010 | Higham |
| 7,734,372 B2 | 6/2010 | Shoenfeld |
| 7,835,819 B2 | 11/2010 | Duncan et al. |
| 8,027,749 B2 | 9/2011 | Vahlberg et al. |
| 8,073,563 B2 | 12/2011 | Vahlberg et al. |
| 8,126,590 B2 | 2/2012 | Vahlberg et al. |
| 8,131,397 B2 | 3/2012 | Vahlberg et al. |
| 8,140,186 B2 | 3/2012 | Vahlberg et al. |
| 8,155,786 B2 | 4/2012 | Vahlberg et al. |
| 8,749,382 B2 | 6/2014 | Sterzinger et al. |
| 9,418,495 B2 | 8/2016 | Mackin et al. |
| 9,697,663 B2 * | 7/2017 | Johnson ................ A47G 29/141 |
| 2004/0054436 A1 | 3/2004 | Haitin et al. |
| 2004/0111179 A1 | 6/2004 | Broadfield et al. |
| 2005/0232747 A1 | 10/2005 | Brackmann et al. |
| 2006/0080819 A1 | 4/2006 | McAllister |
| 2007/0018791 A1 | 1/2007 | Johnson et al. |
| 2007/0194526 A1 | 8/2007 | Randall |
| 2008/0112300 A1 | 5/2008 | Kumhyr et al. |
| 2008/0319577 A1 | 12/2008 | Vahlberg et al. |
| 2008/0319579 A1 | 12/2008 | Vahlberg et al. |
| 2008/0319789 A1 | 12/2008 | Vahlberg et al. |
| 2008/0319790 A1 | 12/2008 | Vahlberg et al. |
| 2009/0015400 A1 | 1/2009 | Breed |
| 2009/0328171 A1 | 12/2009 | Bayus et al. |
| 2010/0042437 A1 | 2/2010 | Levy et al. |
| 2012/0158606 A1 | 2/2012 | Moudy |
| 2012/0229253 A1 * | 9/2012 | Kolar ................ B60R 25/257 340/5.61 |
| 2013/0006652 A1 | 1/2013 | Vahlberg et al. |
| 2013/0187774 A1 | 7/2013 | Muecke et al. |
| 2014/0033774 A1 | 2/2014 | Ofchus et al. |
| 2014/0128023 A1 * | 5/2014 | Guerra ................ G06Q 30/0645 455/406 |
| 2014/0187261 A1 | 7/2014 | Lee et al. |
| 2014/0340191 A1 | 11/2014 | Clark et al. |
| 2015/0077221 A1 * | 3/2015 | Peters ................ G07F 17/00 340/5.28 |
| 2016/0023636 A1 * | 1/2016 | Keating ................ H04W 4/046 701/2 |
| 2016/0155281 A1 | 6/2016 | O'Toole et al. |
| 2016/0253860 A1 | 9/2016 | Wilson et al. |
| 2016/0343187 A1 | 11/2016 | Trani |
| 2017/0113955 A1 * | 4/2017 | Reilly ................ C02F 3/1268 |
| 2017/0188199 A1 * | 6/2017 | Ashley, Jr. ........... G06Q 10/063 |
| 2018/0359343 A1 * | 12/2018 | Lee ................ H04B 1/3888 |
| 2019/0003205 A1 * | 1/2019 | Zastrow ................ E05B 47/0003 |

FOREIGN PATENT DOCUMENTS

| | | |
|---|---|---|
| JP | 2006336254 A | 12/2006 |
| JP | 4557807 | 10/2010 |
| WO | 2010106552 | 9/2010 |
| WO | 2014065196 A1 | 5/2014 |

OTHER PUBLICATIONS

PCT/US2019/015199 received an International Search Report and Written Opinion dated May 30, 2019, 13 pages.
PCT/US2019/015199 received an Invitation to Pay Additional Fees and, Where Applicable, Protest Fee dated Apr. 4, 2019, 2 pages.

(56) References Cited

OTHER PUBLICATIONS

"Apple iPhone 5—the RF", Chipworks, Available Online at: http://www.chipworks.com/en/technical-competitive-analysis/resources/blog//apple-iphone-5-the-rf?lang=en&Itemid=815, May 1, 2015, 7 pages.
"Bluetooth vs. Bluetooth Smart (Low Energy)", Electrical Engineering Stack Exchange, Available Online at: https://electronics.stackexchange.com/questions/53583/bluetooth-vs-bluetooth-smart-low-energy, Sep. 10, 2015, 2 pages.
"Cisco 2700 Series Wireless Location Appliance Deployment Guide", Cisco, Available Online at: https://www.cisco.com/c/en/us/td/docs/wireless/technology/location/deployment/guide/depgd.html, Apr. 23, 2015, 19 pages.
Donovan, "Bluetooth Goes Ultra-Low-Power", Digikey Electronics, Available Online at: https://www.digikey.in/en/articles/techzone/2011/dec/bluetooth-goes-ultra-low-power, Jan. 28, 2016, 6 pages.
"Electronic Article Surveillance", Wikipedia, Available Online at: https://en.wikipedia.org/wiki/Electronic_article_surveillance, Dec. 17, 2015, 6 pages.
"Find My Car Smarter", Find My Car Smarter, Available Online at: http://www.findmycarsmarter.com/setup-usage.html, Oct. 18, 2015, 1 page.
"Geo-Fence", Wikipedia, Available Online at: https://en.wikipedia.org/wiki/Geo-fence, Jan. 20, 2016, 2 pages.
"Near Field Communication", Wikipedia, Available Online at: https://en.wikipedia.org/wiki/Near-field_communication, Feb. 7, 2016, 11 pages.

"Open Dots Technology Specification", Maintained by: Open Dots Alliance© 2014, Rev. 1.2, Available Online at: http://opendotsalliance.org/wp-content/uploads/2014/10/OpenDotsSpecifications1dot2.pdf, 2014, 8 pages.
"Real-Time Locating System", Wikipedia, Available Online at: https://en.wikipedia.org/wiki/Real-time_locating_system, Nov. 6, 2015, 8 pages.
Smith, "Comparing Low-Power Wireless Technologies", Digikey Electronics, Available Online at: https://www.digikey.in/en/articles/techzone/201/aug/comparing-low-power-wireless-technologies, Aug. 21, 2015, 11 pages.
Trifunovic et al., "Slicing the Battery Pie: Fair and Efficient Energy Usage in Device-to-Device Communication Via Role Switching", Sep. 30, 2013, 6 pages.
International Application No. PCT/US2017/016374, International Preliminary Report on Patentability dated Aug. 23, 2018, 14 pages.
International Application No. PCT/US2017/016374, International Search Report and Written Opinion dated Jun. 12, 2017, 18 pages.
International Application No. PCT/US2017/016374, Invitation to Pay Additional Fees and Partial Search Report dated Apr. 3, 2017, 2 pages.
BR1120180161829 received an Office Action dated Jun. 4, 2019, 11 pages.
AU2017216982 received a First Examination Report dated Jul. 16, 2019, 5 pages.

* cited by examiner

RELAY BOX

CROSS REFERENCE TO RELATED APPLICATIONS

This application is a continuation of U.S. patent application Ser. No. 15/019,802, filed Feb. 9, 2016 and titled "Relay Box," the entire disclosure of which is hereby incorporated by reference herein for all purposes.

BACKGROUND OF THE INVENTION

Many industries rely on the accurate inventory and dispensing of secure items. For example, in a hospital setting, it is of paramount importance that patients be given the correct medications in the correct doses. In addition, it is legally required that controlled substances be secured and accurately tracked, and it is also important that inventories of medications and supplies be tracked so that proper business controls can be implemented.

Various dispensing cabinets and carts have been developed to assist in the management of medications and other items. However, improvements are still desired in the reliability of dispensing and tracking of items, especially during transport of items such as medications from one location to another within a facility.

BRIEF SUMMARY OF THE INVENTION

According to one aspect, a relay box for securely transporting medications or other items comprises a main enclosure defining a hollow interior space, and a lockable lid. The lockable lid has a closed position that encloses the hollow interior space and an open position that provides access to the hollow interior space. The relay box further comprises a display area, and a memory storing a globally unique electronically readable identifier of the relay box. In some embodiments, the relay box further comprises a sensor that can detect unauthorized forced entry to the relay box. In some embodiments, the relay box further comprises a non-volatile electronic display in the display area. In some embodiments, the non-volatile electronic display is an electrophoretic display. In some embodiments, the lid is at least partially transparent or translucent. In some embodiments, the relay box does not include a battery. In some embodiments, the memory is a passive memory readable through external electronic excitation. In some embodiments, the relay box further comprises a latch configured to detect forced entry into the relay box, and power stealing circuitry that enables reading of the latch when the passive memory is being excited. In some embodiments, the relay box further comprises an electromagnetic actuator externally controllable to lock and unlock the lid of the relay box. In some embodiments, the relay box further comprises a removable module that holds all circuitry included in the relay box, and that is locked in the relay box when the lid is locked. In some embodiments, the relay box further comprises a battery, a wireless radio transceiver, an electronic controller, and an actuator controlled by the electronic controller, wherein the controller and actuator are configured lock and unlock the lid in response to an instruction received via the wireless radio transceiver. In some embodiments, the relay box further comprises a charging interface configured to receive electrical power from an external source and charge the battery using the received power. In some embodiments, the charging interface further comprises a first set of electrical contacts on one outer surface of the relay box and a second set of electrical contacts on a second outer surface of the relay box, the first and second sets of electrical contacts being positioned such that multiple relay boxes can be stacked and charged in parallel through the electrical contacts. In some embodiments, the relay box further comprises a temperature sensor, wherein the controller monitors readings from the temperature sensor. In some embodiments, the relay box further comprises a mechanical override that enables the lid to be unlocked without an instruction received via the wireless radio transceiver. In some embodiments, the relay box further comprises a mechanical override sensor that detects when the lid is unlocked using the manual override and provides an indication of the mechanical override to the controller. In some embodiments, the wireless radio transceiver is a medium range wireless radio transceiver having a working range of at least 5 meters but less than one kilometer. In some embodiments, the relay box further comprises at least one photovoltaic cell on an outer surface of the relay box to generate power from light incident on the photovoltaic cell, wherein at least some of the power generated by the photovoltaic cell is used to recharge the battery.

DETAILED DESCRIPTION OF THE INVENTION

Figure 1:
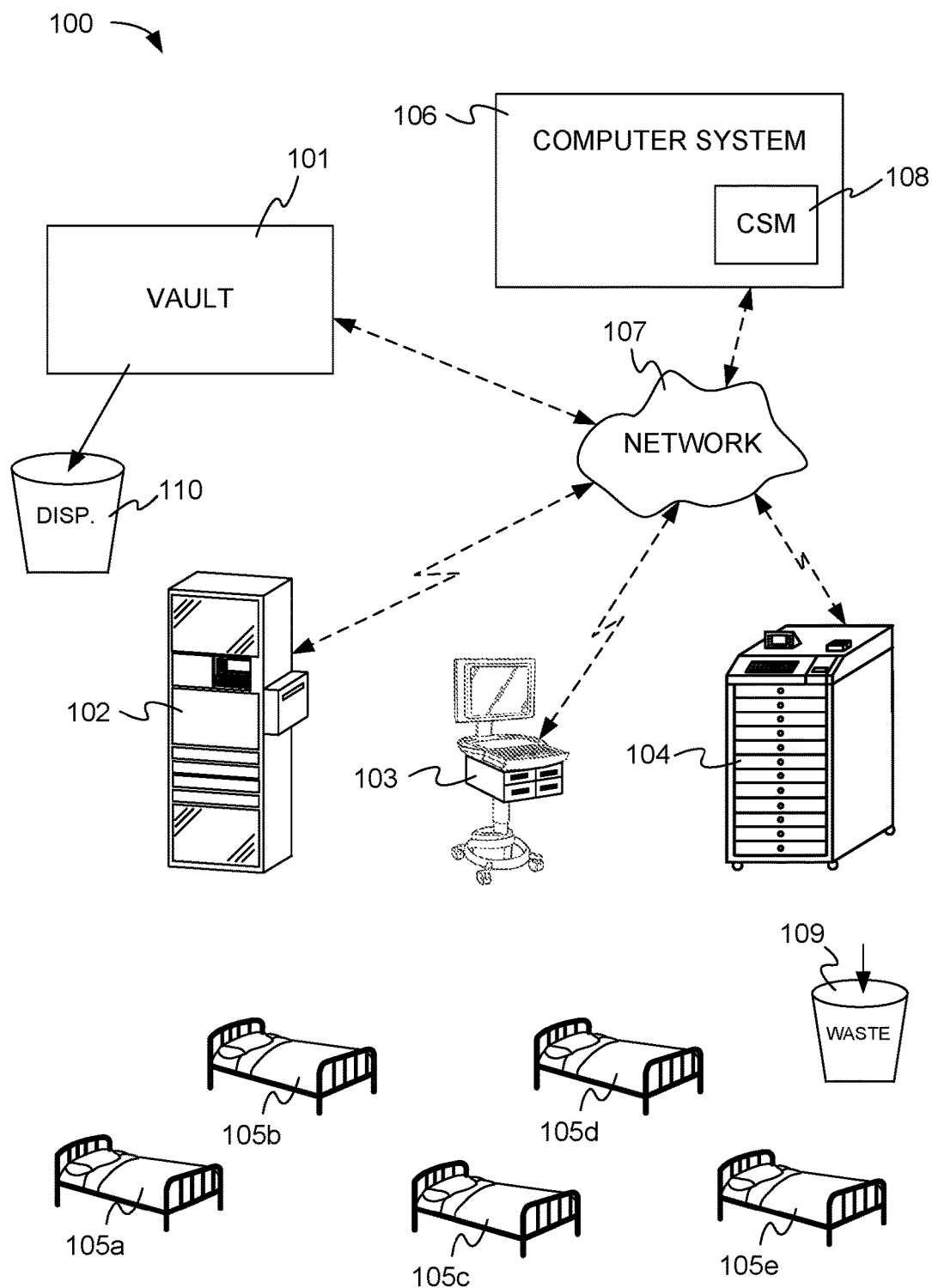
FIG. 1 illustrates an environment in which embodiments of the invention may find utility.

FIG. 1 illustrates an environment in which embodiments of the invention may find utility. Specifically, FIG. 1 illustrates a hospital environment 100, but it will be recognized that embodiments of the invention may be used in other environments as well.

In the example hospital environment of FIG. 1, a vault 101 at a central pharmacy serves as the primary medication storage location. However, various stationary cabinets 102, carts 103, portable cabinets 104, and other storage and dispensing devices may be stationed in different parts of the hospital, for temporary storage of medications and other items. For example, medications commonly used in a particular ward or department of the hospital may be stocked in a cabinet such as cabinet 102, for convenient access by floor personnel. In another example, medications expected to be dispensed to patients during a particular shift may be transferred to a dispensing cart 103 that can follow a nurse on his or her rounds to the patients in beds 105a-105e.

The various dispensing devices 102, 103, 104 may include devices such as those described in the following commonly owned U.S. patents and patent applications, the contents of which are hereby incorporated by reference: U.S. Pat. No. 6,272,394, issued on Aug. 7, 2001 to Lipps, U.S. Pat. No. 6,385,505, issued on May 7, 2002 to Lipps, U.S. Pat. No. 6,760,643, issued on Jul. 6, 2004 to Lipps, U.S. Pat. No. 5,805,455, issued on Sep. 8, 1998 to Lipps, U.S. Pat. No. 6,609,047, issued on Aug. 19, 2003 to Lipps, U.S. Pat. No. 5,805,456, issued on Sep. 8, 1998 to Higham et al., U.S. Pat. No. 5,745,366, issued on Apr. 28, 1998 to Higham et al., an U.S. Pat. No. 5,905,653, issued on May 18, 1999 to Higham et al., U.S. Pat. No. 5,927,540, issued on Jul. 27, 1999 to Godlewski, U.S. Pat. No. 6,039,467, issued on Mar. 21, 2000 to Holmes, U.S. Pat. No. 6,640,159, issued on Oct. 28, 2003 to Holmes et al., U.S. Pat. No. 6,151,536, issued on Nov. 21, 2000 to Arnold et al., U.S. Pat. No. 5,377,864, issued on Jan. 3, 1995 to Blechl et al., U.S. Pat. No. 5,190,185, issued on Mar. 2, 1993 to Blechl, U.S. Pat. No. 6,975,922, issued on Dec. 13, 2005 to Duncan et al., U.S. Pat. No. 7,571,024, issued on Aug. 4, 2009 to Duncan et al., U.S. Pat. No. 7,835,819, issued on Nov. 16, 2010 to Duncan et al., U.S. Pat. No. 6,011,999, issued on Jan. 4, 2000 to Holmes, U.S. Pat. No. 7,348,884, issued on Mar. 25, 2008 to Higham, U.S. Pat. No. 7,675,421, issued on Mar. 9, 2010 to Higham, U.S. Pat. No. 6,170,929, issued on Jan. 9, 2001 to Wilson et al., U.S. Pat. No. 8,155,786 to Vahlberg et al., issued on Apr. 10, 2012, U.S. Pat. No. 8,073,563 to Vahlberg et al., issued on Dec. 6, 2011, U.S. Patent Application Publication No. 2008/0319577 of Vahlberg et al., published on Dec. 25, 2008, U.S. Pat. No. 8,140,186 to Vahlberg et al., issued on Mar. 20, 2012, U.S. Pat. No. 8,126,590 to Vahlberg et al., issued on Feb. 28, 2012, U.S. Pat. No. 8,027,749 to Vahlberg et al., issued on Sep. 27, 2011, U.S. Patent Application Publication No. 2008/0319790 of Vahlberg et al., published on Dec. 25, 2008, U.S. Patent Application Publication No. 2008/0319789 of Vahlberg et al., published on Dec. 25, 2008, U.S. Pat. No. 8,131,397 to Vahlberg et al., issued on Mar. 6, 2012, U.S. Patent Application Publication No. 2008/0319579 of Vahlberg et al., published on Dec. 25, 2008, and U.S. Patent Application Publication No. 2010/0042437 of Levy et al., published on Feb. 18, 2010. Embodiments of the present invention may incorporate features from the devices described in these documents, in any workable combination.

A computer system 106 may execute a program for tracking of medications and supplies throughout the hospital, and may communicate via electronic network 107 with the various dispensing devices 102, 103, 104, to record various transactions involving medications or supplies. Electronic network 107 may be a wired network, a wireless network, or may have both wired and wireless portions. Any suitable networking technology or combination of technologies may be used, for example WiFi™, Bluetooth™, Ethernet, a cellular data network, or other technologies.

Computer system 106 may be informed when a particular medication is removed from or returned to one of the dispensing devices. In particular, computer system 106 may execute a controlled substance management (CSM) application 108, for particular tracking of legally controlled substances. Additional details of systems and methods for tracking supplies, including controlled substances, may be found in U.S. Patent Application Publication Number 2013/0006652 of Vahlberg et al., published on Jan. 3, 2013, the contents of which are hereby incorporated by reference.

Ideally, medications leave the system in only three ways. In a first way, medication is administered to a patient. In a second way of leaving the system, medication may be wasted. For example, if the medication is packaged in a quantity that exceeds the prescribed dose for a particular patient, each administration may result in a leftover amount that is not reusable, and must be discarded 109. In another example of waste, a vial may be dropped and broken, rendering its contents unusable. In a third way of leaving the system, medication may be returned to vault 101 for disposal in a controlled manner 110, for example because the medication has reached its expiration date.

However, medications can also leave the system in other ways, for example due to inadvertent mistake, but also intentionally for illicit use or sale. The illicit removal of controlled substances is known in the art as diversion.

While prior systems may track the movements of medications and supplies into and out of vault 101 and dispensing devices 102, 103, 104, certain other movements may not be tracked by prior systems. For example, a pharmacy technician making restocking rounds to dispensing devices 102, 103, 104 may be essentially untracked during times when he or she is between stops on the restocking route. In another example, a particular medication from vault 101 may be needed at a particular location, and may be dispatched by courier or internal mail delivery from the pharmacy to the location where the medication is needed. During the transport of the medication from the pharmacy to the point of need, the medication is not "visible" to computer system 106. These periods of relative invisibility may present opportunities for diversion.

According to embodiments of the invention, items are packaged in relay boxes for secure, monitored transport, reducing opportunities for diversion.

Figure 2:
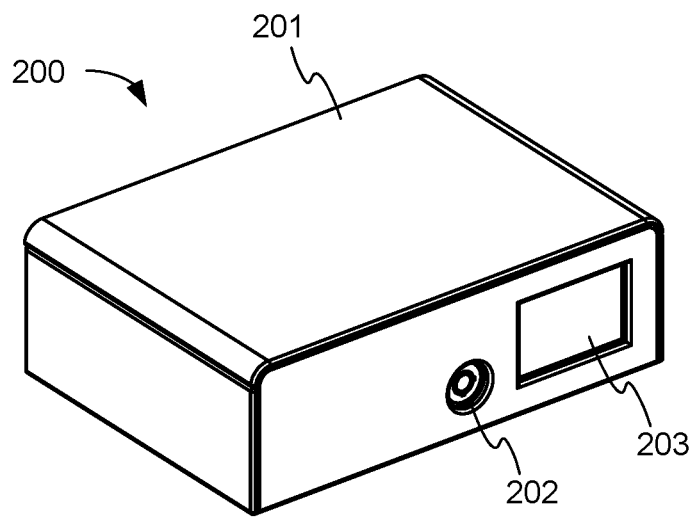
FIG. 2 illustrates a relay box according to some embodiments.

FIG. 2 illustrates a relay box 200 according to some embodiments. Example relay box 200 may be of any suitable size, but may conveniently be about 10-14 inches wide, about 8-12 inches deep, and about 3-5 inches high. The outer shell of relay box 200 is preferably made of a strong, durable material such as steel, aluminum, a reinforced polymer, or another suitable material, or a combination of materials. A lid 201 can be opened to provide access to the hollow interior of relay box 200, and is lockable. In some embodiments, lid 201 may be transparent or translucent, or include a transparent portion so that the contents of relay box 200 may be visible when lid 201 is closed.

While an automated locking mechanism is preferably included, as described in more detail below, a conventional key lock 202 may also be present for accessing the interior of relay box 200 in the event of a failure of the automated lock. A display area 203 may indicate information about the contents of relay box 200. Display area 203 may be as simple as a printed paper card or label adhered to relay box 200 or inserted into a slot in relay box 200, or may include an electronic display such as an LCD display. In some embodiments, a non-volatile electronic display may be used, for example an "electronic paper" electrophoretic display of the kind manufactured by E-Ink Corporation of Cambridge, Mass., USA.

Figure 3:
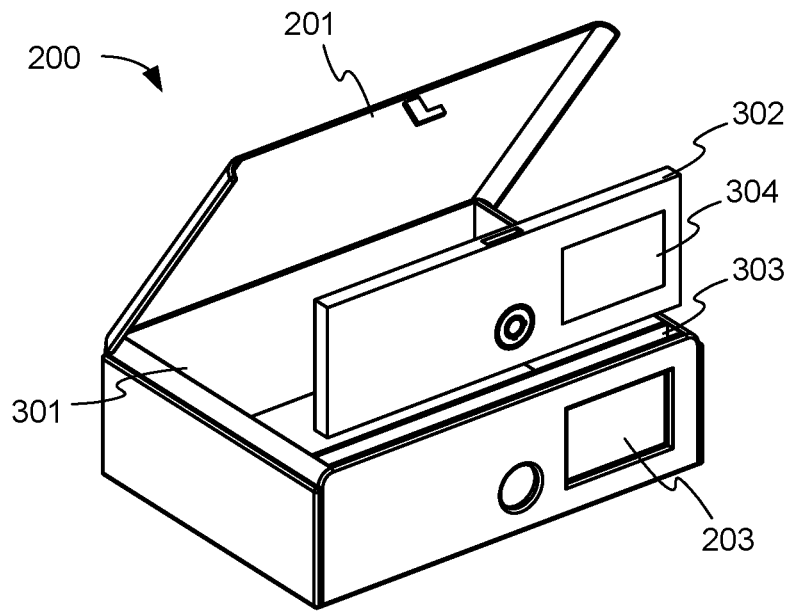
FIG. 3 illustrates the relay box of FIG. 2 in an open state with its lid raised, providing access to interior of the relay box.

FIG. 3 illustrates example relay box 200 in an open state, with lid 201 raised, providing access to interior 301 of relay box 200. A module 302 may be inserted into slot 303, for example to provide display 304 to display area 203. Preferably, any electronic components of relay box 200 are isolated in module 302, such that when module 302 is removed, the rest of relay box 200 may be cleaned by immersing it in water, or washing it in a dishwasher or the like.

Figure 4:
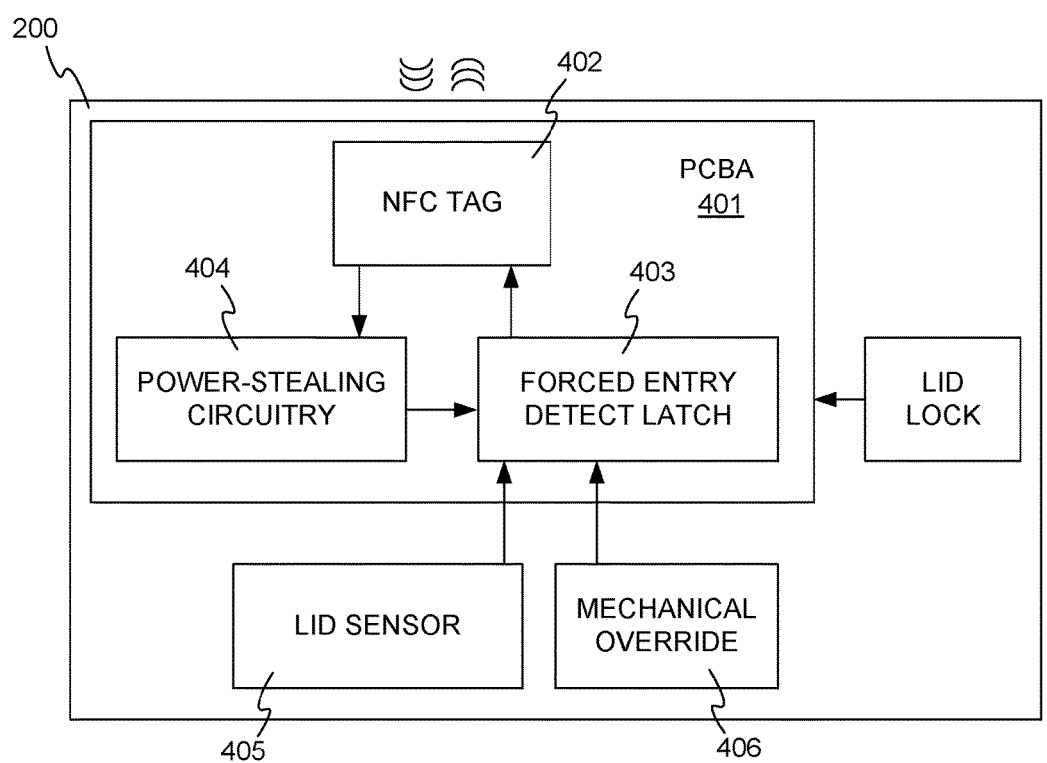
FIG. 4 illustrates a block diagram of the circuitry inside the relay box of FIG. 2, in accordance with embodiments of the invention.

FIG. 4 illustrates a block diagram of the circuitry inside checkpoint-controlled relay box 200, in accordance with embodiments of the invention. In this example, relay box 200 has very little intelligence, and the location of relay box 200 is recorded using checkpoints, as is explained in more detail below. Printed circuit board assembly (PCBA) 401 includes only rudimentary electronic elements, including for example a near field communication (NFC) tag 402, in which a globally unique electronically readable identifier of relay box 200 is stored. The identifier may be read from relay box 200 via an NFC interface, which may excite NFC tag 402 to transmit its stored identifier, without the need for NFC tag 402 to be powered by any power source in relay box 200. While the example of FIG. 4 illustrates the use of NFC, other embodiments may use other kinds of wireless interfaces, for example radio frequency identification (RFID), Bluetooth™, or another kind of interface.

The unique identifier may also be displayed in display area 203, for example on a simple printed card inserted into display area 203, or on a non-volatile display in display are 203.

PCBA 401 may also include a latch 403 for detecting and recording forced entry to relay box 200, and power-stealing circuitry 404 for enabling reading of the state of latch 403 when NFC tag 402 is being excited by an external NFC reader. Latch 403 may react to a lid sensor 405, and a mechanical override 406 may be provided for authorized opening of relay box 200.

Figure 5:
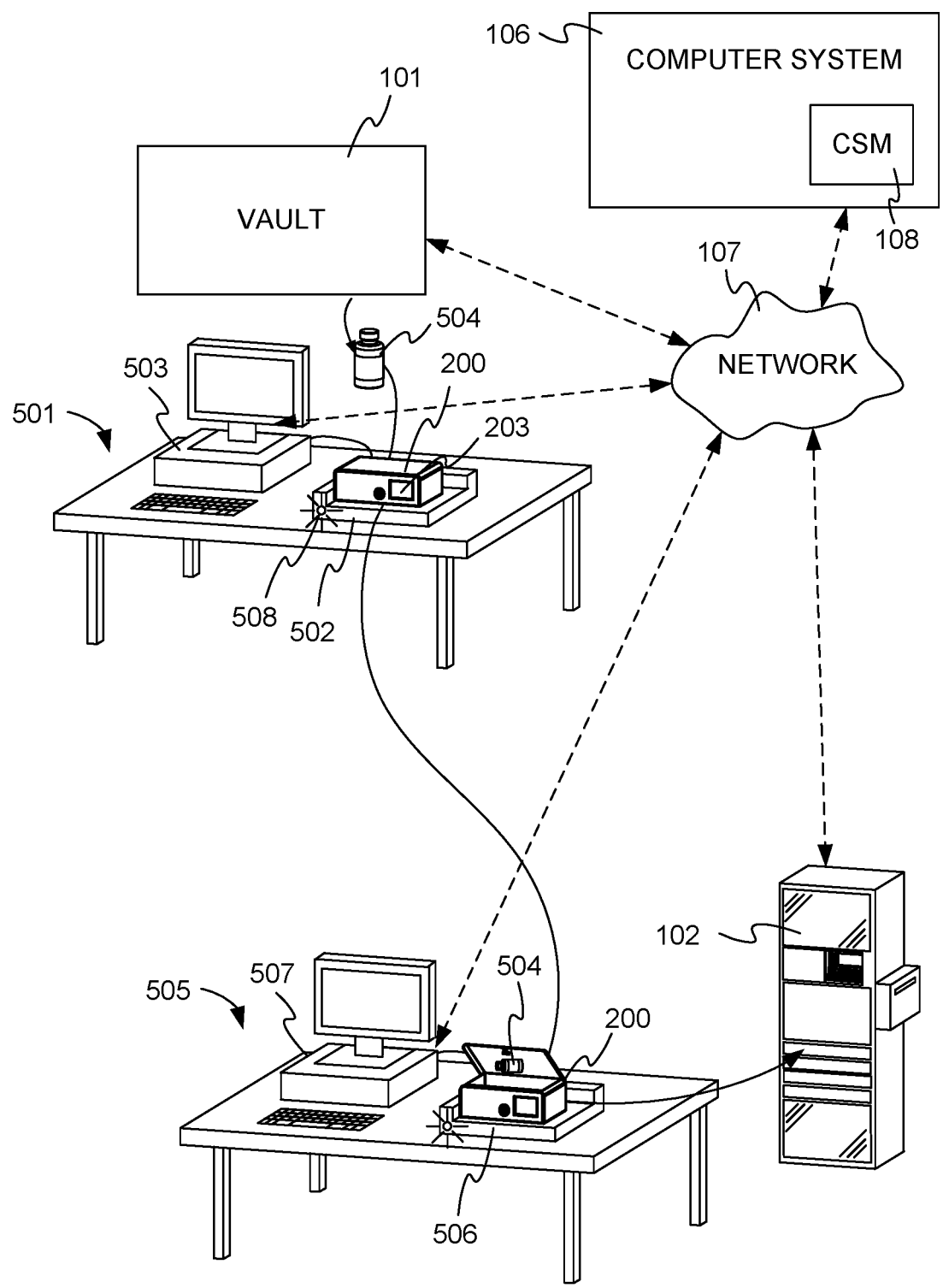
FIG. 5 illustrates the use of a checkpoint-controlled relay box in a system, in accordance with embodiments of the invention.

FIG. 5 illustrates the use of checkpoint-controlled relay box 200 in a system, in accordance with embodiments of the invention. In this example, a medication is being dispatched from vault 101 to storage cabinet 102, using relay box 200. A first checkpoint 501 includes a dock 502 in which relay box 200 can be placed. Dock 502 may include a wireless transceiver for reading the unique identifier within relay box 200 and writing information into the NFC tag in relay box 200. Dock 502 preferably also includes an electromagnetic actuator for locking and unlocking relay box 200. Dock 502 is also connected to network 107. In this example, dock 502 is connected indirectly to network 107 through a computer 503, but a direct connection is possible as well. While the same network 107 is shown as being used in the example of FIG. 5 as in FIG. 1, this is not a requirement, and a different network may be used for tracking the movements of relay box 200.

In some embodiments, dock 502 and similar docks may include one or more visual signals such as a light-emitting diode (LED) 508. LED 508 can be used to signal information about the relay box 200 currently docked with dock 502, for example whether relay box 200 is presently locked or unlocked.

FIG. 5 illustrates the transfer of a vial 504 from vault 101 to cabinet 102. An operator at checkpoint 501 places vial 504 into relay box 200, and causes dock 502 to lock relay box 200 electromagnetically. For example, the operator may enter an indication into computer 503 that vial 504 has been placed in relay box 200 and relay box 200 should be locked. Dock 502 can then contact computer system 106, for example through computer 503, and receive instructions to lock relay box 200. In addition, dock 502 may write information to NFC tag 402 about the contents of relay box 200. A card may be printed and placed in display area 203, providing a human-readable indication of such information as the contents of relay box 200, the destination to which relay box 200 is to be delivered, the intended user or patient for whom the contents of relay box 200 are intended, or other information. In some embodiments, a non-volatile electronic display may be used, and written using a wireless interface similar to the interface use to write information into the memory of relay box 200.

Relay box 200 is then transported, for example via courier or by an on-site mail service, to checkpoint 505, near cabinet 102. During the transport, relay box 200 remains locked, unless it is illicitly opened. At checkpoint 505, another operator places relay box 200 onto a second dock 506, which signals the presence of relay box 200 to computer 507. The second operator may be authenticated by computer 507 as being authorized to open relay box 200. Computer 507 then contacts computer system 106, which sends an instruction that relay box 200 should be unlocked, and computer system 507 then causes dock 506 to electromagnetically open relay box 200, providing access to vial 504. The operator at second checkpoint 505 can then place vial 504 in cabinet 102 by known methods, may provide vial 504 to the floor nurse for administration to a patient, or may put vial 504 to another intended use. Thus, ultimately computer system 106 tracks and controls access to the various relay boxes, with the assistance of docks and possibly other computers at the various checkpoints.

In this example, using checkpoint-controlled relay box 200, security is enhanced by the fact that vial 504 is locked within relay box 200 during transport, and relay box 200 can be legitimately opened only by authorized persons at the various checkpoints 501, 505. In a large hospital setting, a large number of similar checkpoints may be provided at many locations within the hospital, for example at nurses' stations, operating rooms, remote pharmacy stores, and the like. Computer system 106, and if necessary CSM 108, can maintain records of the movements of particular items by virtue of the events reported by the checkpoints.

At the destination checkpoint 505, computer 507 may also, using dock 506, read the contents of forced entry detect latch 403, for signs that relay box 200 was forced open during its travel from checkpoint 501 to checkpoint 505. If evidence of tampering is found, further investigation may be warranted. Similarly, the system may record the fact that relay box 200 is en route to checkpoint 505 and an expected time of arrival. If relay box 200 is not checked in at checkpoint 505 at or near the expected time, investigation may be warranted.

Thus, the system may prevent, hinder, or detect certain instances of diversion.

Figure 6:
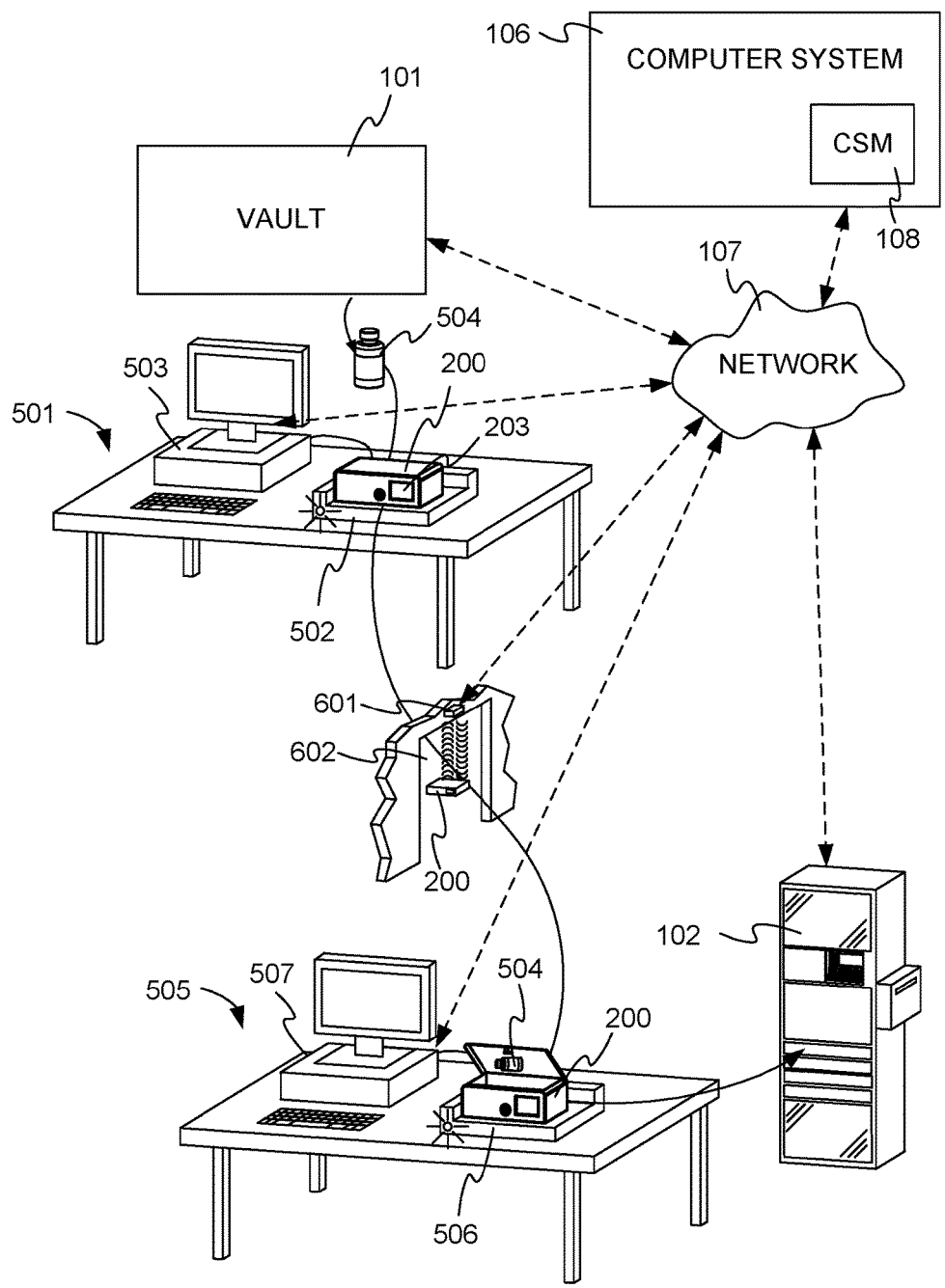
FIG. 6 shows the system of FIG. 5 with the addition of a wireless reading station.

However, the system described above, using checkpoint-controlled relay boxes, may not provide visibility to the locations of items in transit, between the times that relay boxes are registered at the various checkpoints. In some embodiments, additional wireless readers may be positioned around the facility to provide some intermediate information about the locations of relay boxes. For example, FIG. 6 shows the system of FIG. 5 with the addition of a wireless reading station 601 in a doorway 602 through which relay box 200 is transported on its way from checkpoint 501 to checkpoint 505. Doorway 602 (not shown to scale in FIG. 6) may be, for example, a doorway between two wings or wards of a hospital, or any other doorway or portal through which relay boxes may be expected to pass. Of course, reading stations such as reading station 601 may be placed at other locations as well, and not only in doorways. Reading station 601 may continually scan for relay boxes passing near it, and report the identifiers of any detected relay boxes to computer system 106. Thus, intermittent additional information may be obtained about the whereabouts of the relay boxes and their contents. The various reading stations can report the passage of particular relay boxes.

While relay box 200 is described above as being a passive device without internal power, a small battery may be provided for the purpose of powering intrusion detection circuitry. Preferably, information exchange at checkpoints and reading stations is passive, excited by electromagnetic signals from each checkpoint or reading station. All recorded detections of relay boxes are preferably time stamped, so that the location history of each relay box can be reconstructed in as much detail as possible.

According to other embodiments, a "stand-alone" relay box may be provided, as opposed to a "checkpoint-controlled" relay box. In some embodiments, a system may be capable of using a mix of these two types.

Figure 7:
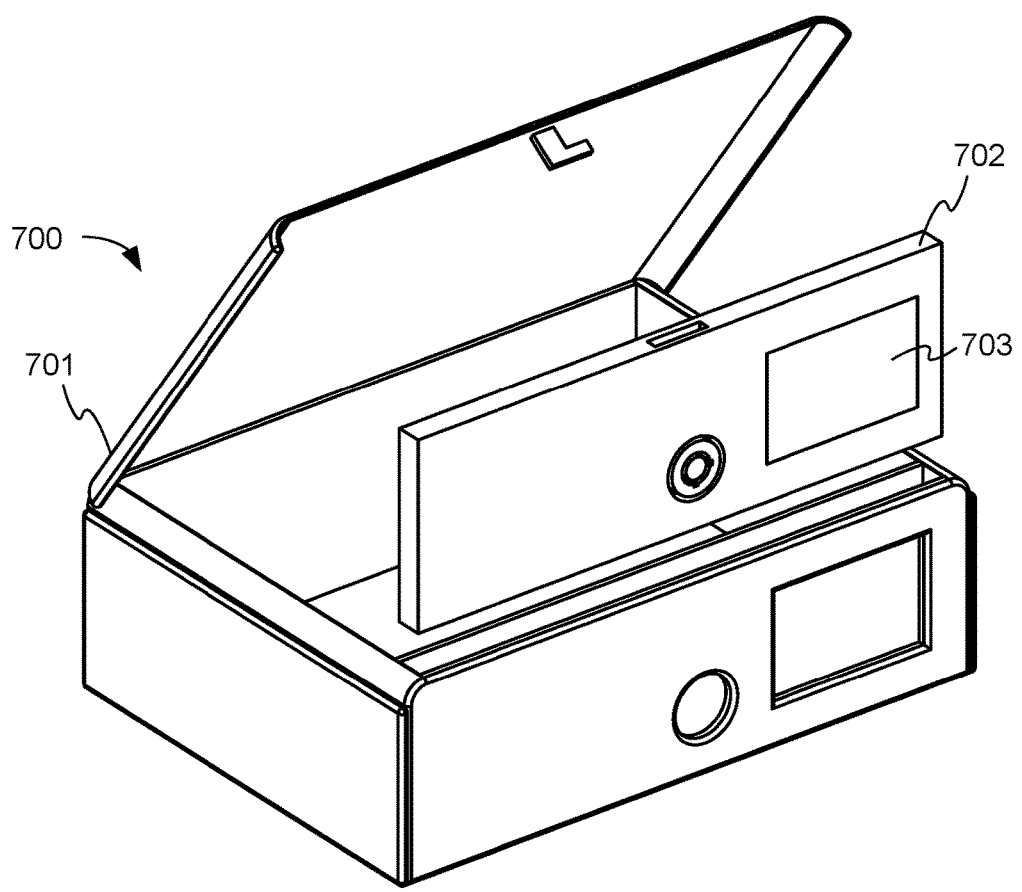
FIG. 7 illustrates a stand-alone relay box, in accordance with embodiments of the invention.

FIG. 7 illustrates a stand-alone relay box 700, in accordance with embodiments of the invention. As compared with checkpoint-controlled relay box 200, stand-alone relay box 700 includes a power source such as one or more batteries, more sophisticated processing, and additional communications capabilities.

Like relay box 200, relay box 700 includes a main enclosure with a lockable lid 701. Module 702 may include batteries (not visible), a display 703, and other electronic and mechanical components. Display 703 may be any suitable type of display, for example an "electronic paper" electrophoretic display.

Figure 8:
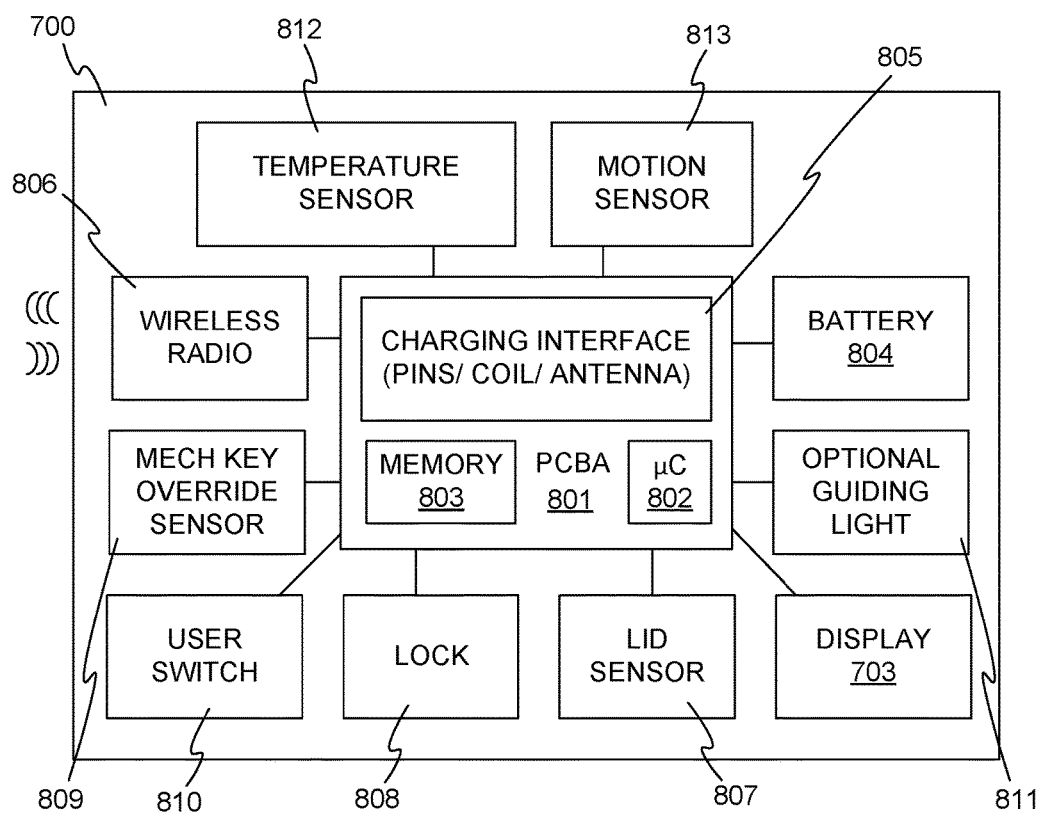
FIG. 8 illustrates a block diagram of the stand-alone relay box of FIG. 7, in accordance with embodiments of the invention.

FIG. 8 illustrates a block diagram of stand-alone relay box 700, in accordance with embodiments of the invention. A printed circuit board assembly (PCBA) 801 includes a microcontroller 802 that controls the various functions of relay box 700, under control of instructions stored in microcontroller 802 or another memory. In other embodiments, a microprocessor and associated support circuitry may take the place of microcontroller 802. The unique identifier of relay box 700 is stored in a non-volatile memory 803 on PCBA 801. Memory 803 may be a flash memory or another suitable kind of memory. Stand-alone relay box 700 includes a battery 804 for supplying power to microcontroller 802 and other elements. For example, battery 804 may be a rechargeable battery such as a nickel-metal-hydride (NiMH), nickel-cadmium (NiCad), or another suitable kind of rechargeable battery. In other embodiments, non-rechargeable batteries may be used.

When rechargeable batteries are used, relay box 700 may include a recharging interface 805 for supplying power from an external source to battery 804. For example, charging interface 805 may include pins on the exterior of relay box 700 connected to PCBA 801 for making a direct connection to a power source in a charging station outside of relay box 700. In other embodiments, charging interface 805 may include a coil or other antenna for receiving energy via electromagnetic induction from an external transmitter.

Stand-alone relay box 700 also includes a wireless radio transceiver 806 for wireless communication with other devices, as is explained in more detail below. Wireless radio transceiver 806 may be any suitable kind of radio transceiver, for example a Bluetooth™ transceiver, a WiFi™ transceiver, or another kind of transceiver. Preferably, wireless radio transceiver 806 is a medium range wireless transceiver. For example, wireless radio transceiver may have a working range of up to 5 meters, up to 10 meters, up to 100 meters, up to 1000 meters, or another suitable range. Specifically, a medium range wireless radio transceiver is not limited to communicating over distances of a few inches or less, as may be the case with NFC devices. Similarly, a medium range wireless transceiver is not capable of direct communication over distances measured in multiple kilometers or miles.

Stand-alone relay box 700 has the advantage that docking stations such as dock 502 are not needed. Relay box 700 may be in direct wireless communication with a computer system such as computer system 106. An authorized user may request that relay box 700 be opened, and computer system 106 may then instruct relay box 700 to unlock itself by actuating lock 808. Lock 808 may be any suitable kind of lock, for example a lock actuated by a motor powered from battery 804, or a lock actuated by the change in shape of a memory metal element such as a Nitinol element.

Because relay box 700 includes an on-board power source (battery 804 e.g.), stand-alone relay box 700 can perform functions that checkpoint-controlled relay box 200 cannot without the help of a docking station. Before instructing relay box 700 to open, computer system 106 may require some verification that an authorized user is making the request. For example, the user may be required to scan the unique identifier from relay box 700 and transmit it to computer system 106, along with an identification of the user, to verify that the authorized user is actually in possession of relay box 700. The scanning and authentication may be performed using a cellular telephone or other similar portable electronic device that can read the unique identifier and communicate wirelessly with computer system 106. The scanning may be electronic, for example reading the identifier from memory 803 via NFC or another wireless technique. In other embodiments, the scanning may be optical. For example, the identifier may be displayed on display 703 in the form of a barcode, a QR code, or in some other optically readable format.

Stand-alone relay box 700 may include other features as well. For example, display 703 is discussed above. A lid sensor 807 detects forced entry to relay box 700, which can then report the forced entry to computer system 106, possibly immediately. A mechanical key override sensor 809 may detect when relay box 700 is being opened with a mechanical key, and may suppress any determination that the entry is an unauthorized forced entry. Relay box 700 may still report the key entry to computer system 106. A user switch 810, for example a pushbutton or another kind of switch, may be used for signaling microcontroller 802, and an optional guiding light may be illuminated to guide a user to relay box 700. For example, guiding light 811 may be illuminated upon a command from computer system 106 to unlock relay box 700, to distinguish relay box 700 from other similar relay boxes in the area. Or computer system 106 may cause guiding light to be illuminated when relay box 700 reaches its destination.

Other components may be present in some embodiments. For example, a small battery may be provided as a backup to the larger battery 804, for ongoing intrusion detection in the event that battery 804 is inadvertently allowed to discharge completely.

Stand-alone relay box 700 may further include a battery charge level indicator, for example a set of four lights, the number of which are illuminated indicates the battery charge level. In some embodiments, relay box 700 includes an audible alarm, which may be used for any of a number of purposes. For example, the audible alarm may be sounded in the event of an unauthorized intrusion into relay box 700, or in the event of a suspected theft of relay box 700. Such an audible alarm might also be used in locating a particular relay box 700, to indicate a low battery charge level, or for other purposes.

In some embodiments, stand-alone relay box 700 may include a temperature sensor 812, a motion sensor 813, or both. For example, microcontroller 802 may monitor the output of temperature sensor 812 and report excursions of temperature beyond an expected temperature range. Excursions of temperature may be especially of interest when relay box 700 is used to transport medications whose efficacy depends on maintaining a particular storage temperature. If a temperature outside a specified range is detected, relay box 700 may report the detection for possible action by facility personnel. Extremes of temperature may also be indicative of diversion of relay box 700 to a location outside its expected usage area, for example outdoors. Similarly, microcontroller 802 may monitor the output of motion sensor 813 for motion signatures that may indicate undesired rough handling, diversion, or other adverse circumstances. Relay box 700 may also report the fact that no detrimental temperature or motion has been detected, if desired.

Figure 9:
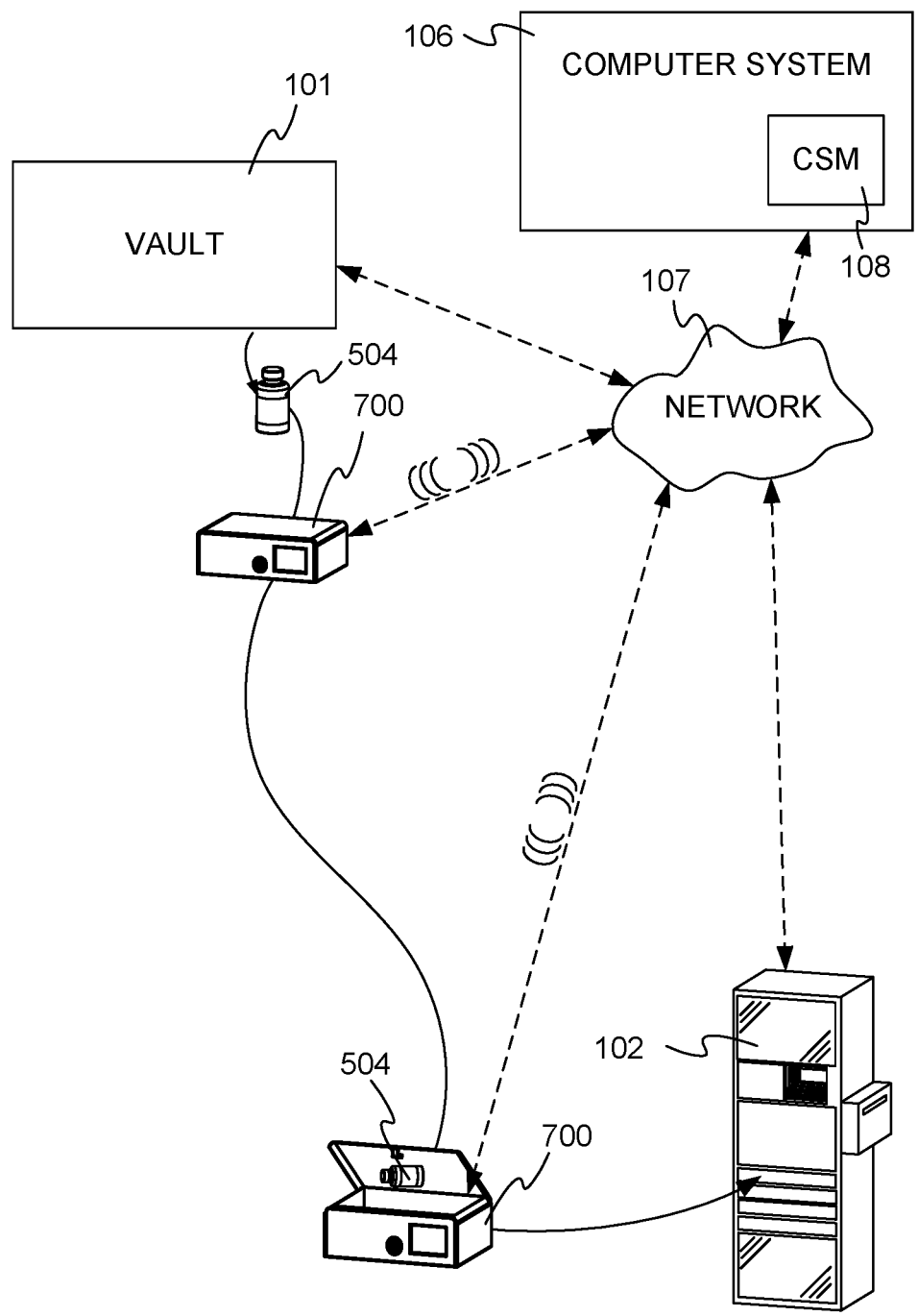
FIG. 9 illustrates the use of the stand-alone relay box of FIG. 7 in a system, in accordance with embodiments of the invention.

FIG. 9 illustrates the use of stand-alone relay box 700 in a system, in accordance with embodiments of the invention. In the example of FIG. 9, a vial 504 of medication is being transferred from vault 101 to storage cabinet 102, in another part of the facility. At the pharmacy, a technician or pharmacist, after proper authentication, places vial 504 in relay box 700. Information about the transfer is communicated to computer system 106 via network 107. For example, the date and time at which relay box 700 was loaded, the contents of relay box 700, and the intended destination or user of relay box 700 may be transmitted. Other information may be transmitted as well. Computer system 106 then commands relay box 700 to lock.

Relay box 700 may then be transported to a location at cabinet 102, for example by courier, site mail services, or the like. Another user at cabinet 102 may verify to computer system 106 that he or she is in possession of relay box 700, and request that relay box 700 be opened. After authorization is verified, computer system 106 signals relay box 700 to unlock itself. Vial 504 can then be removed and placed in cabinet 102, or used for anther intended purpose.

No docking stations are needed for locking and unlocking of stand-alone relay box 700, and transfers of medications to and from relay box 700 can be accomplished anywhere within wireless radio range of network 107. Battery 804 should be recharged or replaced regularly, and recharging stations may be provided at various places within the facility.

In some embodiments, relay box 700 may include a transceiver for interaction with a real time location system (RTLS). In such a system, a number of stations are placed in known, fixed locations throughout the facility, and constantly interact wirelessly with each RTLS-equipped relay box. The system may use the difference in arrival time of signals from the relay box to the fixed stations to calculate the location of each relay box. In such an embodiment, the location of a particular relay box 700 may be known within a few inches at nearly all times. In some embodiments, wireless radio 806 may serve as the transceiver for real time location in addition to its use in communicating with computer system 106. In other embodiments, a different transceiver may be used, in addition to wireless radio 806. The RTLS transceiver may be any suitable kind of transceiver, for example a Bluetooth™ or WiFi™ transceiver. In some embodiments, the RTLS transceiver may be an ultra-wide-band transceiver in accordance with IEEE specification 802.15.4-2011.

Figure 10:
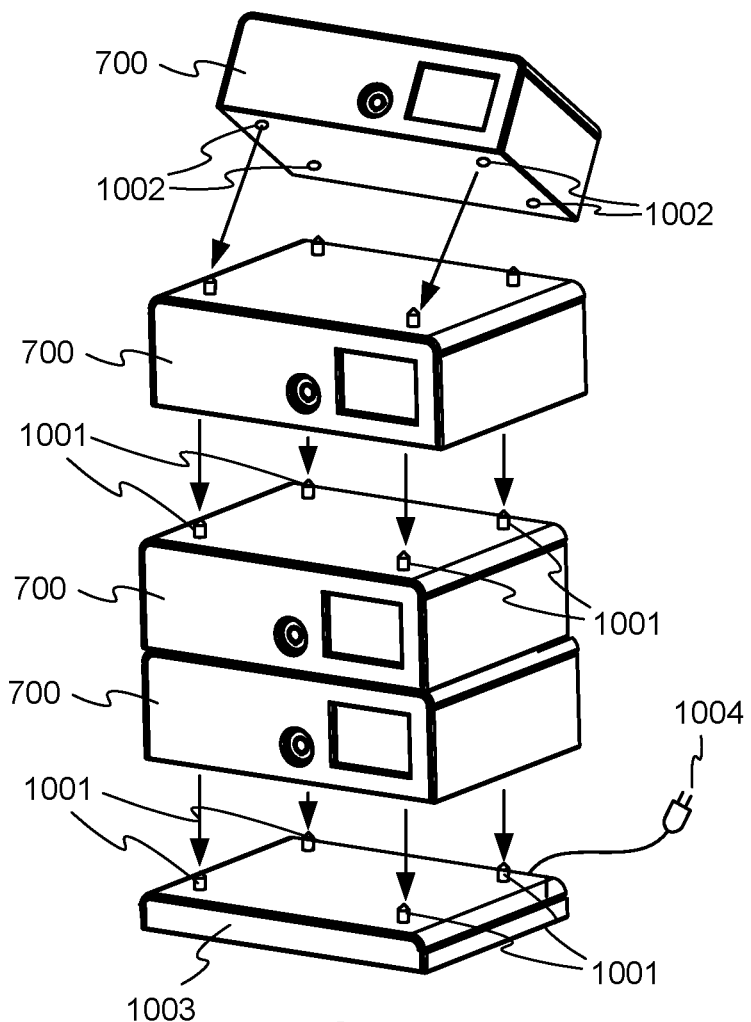
FIG. 10 illustrates a technique for recharging a battery of the relay box of FIG. 7, in accordance with embodiments of the invention.

FIG. 10 illustrates one technique for recharging battery 804, in accordance with embodiments of the invention. In this example, each relay box 700 includes a set of metallic pins 1001 that are electrically coupled to a charging circuit within relay box 700. Each relay box 700 also includes a complementary set of recessed receptacles 1002, such that a number of relay boxes 700 can be stacked together, with the pins 1001 of one relay box 700 coupling with the receptacles 1002 of another. A charging platform 1003 also includes a set of pins 1001, and a connection 1004 to mains power. Power is conducted from charging platform 1003 from one stacked relay box 700 to the next through coupled pins 1001 and receptacles 1002.

Figure 11:
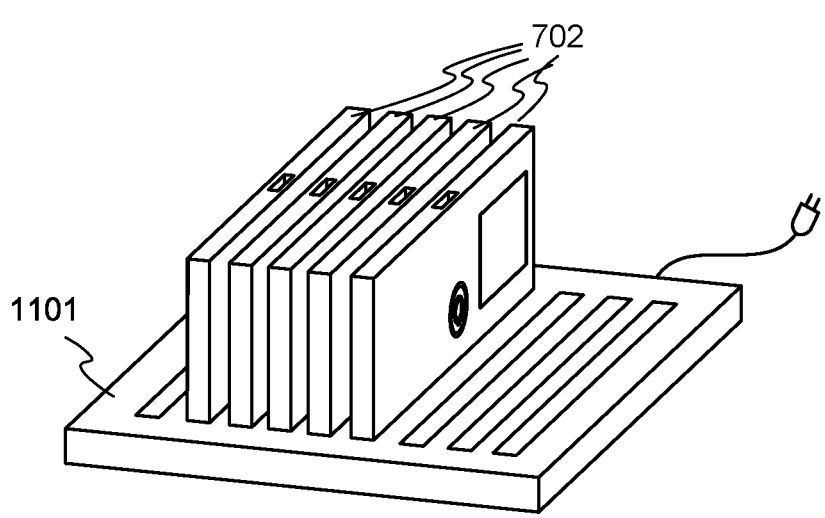
FIG. 11 illustrates another technique for recharging a battery of the relay box of FIG. 7, in accordance with embodiments of the invention.

FIG. 11 illustrates another option for recharging battery 804, in accordance with other embodiments of the invention. In the arrangement of FIG. 11, a charging cradle 1101 accepts a number of modules 702 that are removed from their respective relay boxes 700 and placed on charging cradle 1101 for charging. Cradle 1101 may make a direct connection to modules 702, or may charge modules 702 by electromagnetic induction.

In some embodiments, a photovoltaic cell may be placed on a face of relay box 700, to generate electric power from incident light. The power may then be used to charge battery 804, or to at least extend the operation of relay box 700 from a single charge.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. It is to be understood that any workable combination of the elements and features disclosed herein is also considered to be disclosed.

The invention has now been described in detail for the purposes of clarity and understanding. However, those skilled in the art will appreciate that certain changes and modifications may be practiced within the scope of the appended claims.

What is claimed is:

1. A relay box for securely transporting medications or other items, the relay box comprising:
   a main enclosure defining a hollow interior space;
   a lockable lid having a closed position that encloses the hollow interior space and an open position that provides access to the hollow interior space;
   a display area;
   a memory storing a globally unique electronically readable identifier of the relay box;
   a battery;
   a wireless radio transceiver;
   an electronic controller;
   an actuator controlled by the electronic controller, wherein the controller and actuator are configured to lock and unlock the lid in response to an instruction received via the wireless radio transceiver; and
   a charging interface configured to receive electrical power from an external source and charge the battery using the received power;
   wherein the charging interface further comprises a first set of electrical contacts on one outer surface of the relay box and a second set of electrical contacts on a second outer surface of the relay box, the first and second sets of electrical contacts being positioned such that multiple relay boxes can be stacked and charged in parallel through the electrical contacts.

2. A relay box for securely transporting medications or other items, the relay box comprising:
 a main enclosure defining a hollow interior space;
 a lockable lid having a closed position that encloses the hollow interior space and an open position that provides access to the hollow interior space;
 a display area; and
 a memory storing a globally unique electronically readable identifier of the relay box;
 wherein the relay box does not include a battery;
 and wherein the memory is a passive memory readable through external electronic excitation;
 and wherein the relay box further comprises:
 a latch configured to detect forced entry into the relay box; and
 power stealing circuitry that enables reading of a state of the latch when the passive memory is being excited.

3. A relay box for securely transporting medications or other items, the relay box comprising:
 a main enclosure defining a hollow interior space;
 a lockable lid having a closed position that encloses the hollow interior space and an open position that provides access to the hollow interior space;
 a display area;
 circuitry including a memory, the memory storing a globally unique electronically readable identifier of the relay box; and
 a removable module comprising a display, wherein the removable module holds the circuitry, and is locked in the relay box when the lid is locked;
 wherein the relay box is transportable.

4. The relay box of claim 3, further comprising a sensor that can detect unauthorized forced entry to the relay box.

5. The relay box of claim 3, wherein the display is a non-volatile electronic display.

6. The relay box of claim 5, wherein the non-volatile electronic display is an electrophoretic display.

7. The relay box of claim 3, wherein the lid is at least partially transparent or translucent.

8. The relay box of claim 3, wherein the relay box does not include a power source.

9. The relay box of claim 8, wherein the memory is a passive memory readable through external electronic excitation.

10. The relay box of claim 8, further comprising an electromagnetic actuator externally controllable to lock and unlock the lid of the relay box.

11. The relay box of claim 3, further comprising:
 a battery;
 a wireless radio transceiver;
 an electronic controller; and
 an actuator controlled by the electronic controller, wherein the controller and actuator are configured to lock and unlock the lid in response to an instruction received via the wireless radio transceiver.

12. The relay box of claim 11, further comprising a charging interface configured to receive electrical power from an external source and charge the battery using the received power.

13. The relay box of claim 11, further comprising a temperature sensor, wherein the controller monitors readings from the temperature sensor.

14. The relay box of claim 11, further comprising a mechanical override that enables the lid to be unlocked without an instruction received via the wireless radio transceiver.

15. The relay box of claim 14, further comprising a mechanical override sensor that detects when the lid is unlocked using the mechanical override and provides an indication of the mechanical override to the controller.

16. The relay box of claim 11, wherein the wireless radio transceiver is a medium range wireless radio transceiver having a working range of at least 5 meters but less than one kilometer.

17. The relay box of claim 11, further comprising at least one photovoltaic cell on an outer surface of the relay box to generate power from light incident on the photovoltaic cell, wherein at least some of the power generated by the photovoltaic cell is used to recharge the battery.

* * * * *

UNITED STATES PATENT AND TRADEMARK OFFICE
CERTIFICATE OF CORRECTION

| | | |
|---|---|---|
| PATENT NO. | : 10,460,546 B2 | Page 1 of 1 |
| APPLICATION NO. | : 16/216813 | |
| DATED | : October 29, 2019 | |
| INVENTOR(S) | : John Foot, Paul Newby and Jeff Chang | |

It is certified that error appears in the above-identified patent and that said Letters Patent is hereby corrected as shown below:

In the Specification

Column 5, Line 29:
Delete "are" and insert -- area --, therefor.

Signed and Sealed this
Third Day of March, 2020

Andrei Iancu
*Director of the United States Patent and Trademark Office*